United States Patent [19]

Septer

[11] Patent Number: 5,343,813
[45] Date of Patent: Sep. 6, 1994

[54] COIL TRANSPORTER

[76] Inventor: Donald R. Septer, 18158 Bracken Cir., Port Charlotte, Fla. 33948

[21] Appl. No.: 89,244

[22] Filed: Jul. 12, 1993

Related U.S. Application Data

[63] Continuation-in-part of Ser. No. 904,949, Jun. 26, 1992, abandoned.

[51] Int. Cl.⁵ .............................................. B60P 3/00
[52] U.S. Cl. ................................... 105/355; 410/47
[58] Field of Search ................. 410/47, 48, 49, 50, 410/44; 105/355, 413, 422

[56] References Cited

U.S. PATENT DOCUMENTS

| | | | |
|---|---|---|---|
| 487,765 | 12/1892 | Ormerod | 410/49 |
| 2,622,918 | 12/1952 | Staffe | 296/28 |
| 2,810,602 | 10/1957 | Abrams | 296/25 |
| 2,971,795 | 2/1961 | Winski | 296/28 |
| 3,376,062 | 4/1968 | Chosy et al. | 296/28 |
| 3,581,674 | 6/1971 | O'Leary | 105/367 |
| 3,715,993 | 2/1973 | Orlik | 410/49 |
| 3,740,073 | 6/1973 | Schwiebert | 410/47 |
| 4,451,188 | 5/1984 | Smith et al. | 410/42 |
| 5,048,885 | 9/1991 | Bomar | 410/49 |
| 5,170,717 | 12/1992 | Richmond et al. | 410/49 |

FOREIGN PATENT DOCUMENTS

| | | | |
|---|---|---|---|
| 3303323 | 6/1984 | Fed. Rep. of Germany | 410/50 |
| 2052416 | 1/1981 | United Kingdom | 410/49 |

*Primary Examiner*—Mark T. Le
*Attorney, Agent, or Firm*—Frank A. Lukasik

[57] ABSTRACT

The present invention is an improved load carrying trailer designed to carry long, metal coils or cylindrical objects transversely or longitudinally of said trailer and various shaped articles in a conventional manner and comprises inner and outer channel beams having a "V" shaped notch intermediate the front and back ends, steel plates fastened across the top sides of said channels at the front and back ends to form a trailer bed and at opposite sides of said notch for seating the coiled load, steel bars fastened across the top sides of the channels, fore and aft of said notches, cross bar members fastened to the open ends of the "V" formed by the channels, and straps for locking the coil in position. A second embodiment carries the coil longitudinally.

3 Claims, 6 Drawing Sheets

COIL TRANSPORTER

RELATED APPLICATION

This application is a continuation in part of patent application Ser. No. 07/904,949 filed Jun. 26, 1992, now abandoned.

The invention was filed under the Disclosure Document Program on Mar. 8, 1991, Disclosure Document Number 275,779.

BACKGROUND OF THE INVENTION

1. Field of the Invention

The present invention relates to trailers and more particularly to trailers and similar vehicles for hauling coils of steel and the like.

2. Discussion of the prior art

There has existed a need in the highway transportation of heavy coils of steel and other objects having a circular contour for the provision of a trailer bed construction which will firmly seat such coils and curb their tendency to roll. Most prior constructions which have attempted to solve this problem have provided superstructure on the trailer bed as upwardly extending rails, clamps and the like.

In the conventional method of transporting steel coils on highways and streets from the steel mills to steel fabricators, the coils are placed on a trailer bed in end-to-end position and held on the trailer by placing wood timbers along each side of the coils on the trailer floor and securing the coils in position with a number of large chains extending through the ID of the coils and fastened at their ends to side rails or the trailer frame. This method of securing the coils onto the trailer is not only laborious and time consuming, but also requires frequent replacement of the timbers from one load to another and is not a consistently reliable means of retaining the coils on the trailer because this method relies strictly on the chains to secure the coils. Other methods, including the use of trailers having a longitudinal channel in the center of the bed have been tried but this latter type has had the inherent disadvantage that the trailer either will not safely haul different sized coils, or the coils are damaged by the supporting structure on which the coils are placed. The use of timbers in the channel type trailer to protect the coils has likewise required frequent replacement of the timbers involving substantial costs both of labor and material.

Coils of strip steel or other metal, generally range in weight from approximately 2,000 pounds to 67,000 pounds. It is obvious that if these coils are not firmly seated in position during transportation, great damage could result. It is necessary to provide against the tendency of the coils to roll and also to provide against the possible unbalancing of the coils along their transverse axes. Should the trailer become disconnected from the tractor, while traveling on the highway, it is extremely dangerous to have the load of coils accidentally fall from the trailer.

Several prior art attempts to provide trailer beds particularly adapted for hauling coils of steel which firmly seats such coils and prevents accidental displacement thereof.

U.S. Pat. No. 2,622,918 to Staffe discloses a trailer bed having a central longitudinally extending recess providing a trough for seating a heavy steel coil. The trough used by Staffe provides a six inch drop from the level of the trailer bed at the center of the trough and is twenty-seven inches in width.

U.S. Pat. No. 2,810,602 to Abrams discloses a vehicle body having longitudinally spaced load supports or stands. Each of the deck spaces in combination with the side walls of the stands form a trough for carrying the rolls of material with their axes disposed transversely of the vehicle. The troughs are of the same general shape except those over the wheels.

U.S. Pat. No. 2,971,795 to Winski, discloses a coil hauling vehicle provided with a longitudinal channel in the center of the trailer body. The coils are placed end to end in the channel with the sides of the coils resting on the convex surfaces on the support members. The frame structure consists of longitudinal I-beams extending the full length of the trailer body and has a wide portion above the wheels, a narrow portion above the tractor, and a connecting tapered portion.

U.S. Pat. No. 3,376,062 to Chosy et al discloses a trailer body provided with a well or channel in which a coiled product can be seated. The channel can be covered by cover members to carry a flat load.

U.S. Pat. No. 3,581,674 to O'Leary discloses a flat railway car in which a depressed center section of the car extends the length of the car to form a pocket or well to receive steel coils.

U.S. Pat. No. 4,451,188 to Smith discloses a rail car for carrying coiled material which can be converted from a first position to a second position to provide different trough arrangements for seating coils of different sizes.

None of the prior art trailers provide the necessary protection required for sudden stops or turns which are necessitated in emergencies on the highways which cause the prior art devices to become dangerous instrumentalities of death on the currently crowded highways. Each of the prior art trailers cradle the coil load substantially above the center of gravity and are merely adaptations of state-of-the-art trailers.

SUMMARY OF THE INVENTION

The present invention is an improved load carrying trailer designed to hold the largest transportable coil of metal which can practically be transported from the producing mills to the users. The coil transporter of the invention makes it easier to transport coils of sheet steel, wire, cable and other heavy, round, or flat items. The invention helps to prevent cargo from coming loose during an accident, sudden stop or other maneuver, an occurrence that may cause death or injuries to other motorists, making it safer to drive on the nation's highways. The modified "low boy" truck of the invention, has a "V"-shaped notch in the middle of the trailer bed. The transporter includes flat bed areas in the front and back. Steel cross bar members used on the open ends of the "V" prevent transverse motion of the load. A cylindrical load placed in the "V" is secured to steel crossbars or eye bolts and chains fastened to the flat bed. Additional straps to the sides of the "V" may be used for added securement, to prevent dislodging of coils from the trailer. This trailer may also be used to carry combination loads of flat bundles of sheared steel fore and aft of the "V" in conjunction with a coil load, subject to weight limits. The trailer may also be used to carry long lengths of pipe, tubing, angles, channels, I-beams, etc., which will span the "V" notch and be secured by straps to side rails, as with conventional flat bed trailers. In a second embodiment, the "V" notch is placed longitudinally in the center of the trailer.

It is therefore a primary object of the invention to provide a trailer bed particularly adapted for hauling coils of steel which firmly seats such coils and prevents accidental displacement thereof.

It is another object of the invention to provide a trailer which can haul steel coils of various sizes without adjustments or alterations in the vehicle structure being required.

Still another object of the invention is to provide a trailer bed for hauling, handling, and storing coils of steel or other metal, having a transverse channel for receiving and holding the coils regardless of variations in diameter over a wide range.

A further object of the invention is to provide a trailer bed of the above character which is relatively inexpensive to manufacture, rugged in construction and reliable in use.

A still further object of the invention is to provide a trailer bed of the above character which can also be used to carry a combination of loads in conjunction with coils.

Still another object of the invention is to carry long items secured to side rails in a conventional manner.

Another object of the invention is to provide a trailer bed for hauling, handling, and storing coils of steel or other metal, having a longitudinal channel for receiving and holding the coils regardless of variations in diameter over a wide range.

Other objects and a fuller understanding of this invention may be had by referring to the following description and claims, taken in conjunction with the accompanying drawings, in which:

FIG. 7 is a side elevational view of the trailer body showing a second embodiment of the invention with a coil of metal in a longitudinal position, FIG. 8 is a sectional view of the trailer body along lines 8—8.

FIG. 9 is a sectional view of the trailer body along lines 9—9.

FIG. 10 is a bottom view of the trailer body showing a second embodiment of the invention with a coil of metal in a longitudinal position.

DESCRIPTION OF THE PREFERRED EMBODIMENT

Figure 1:
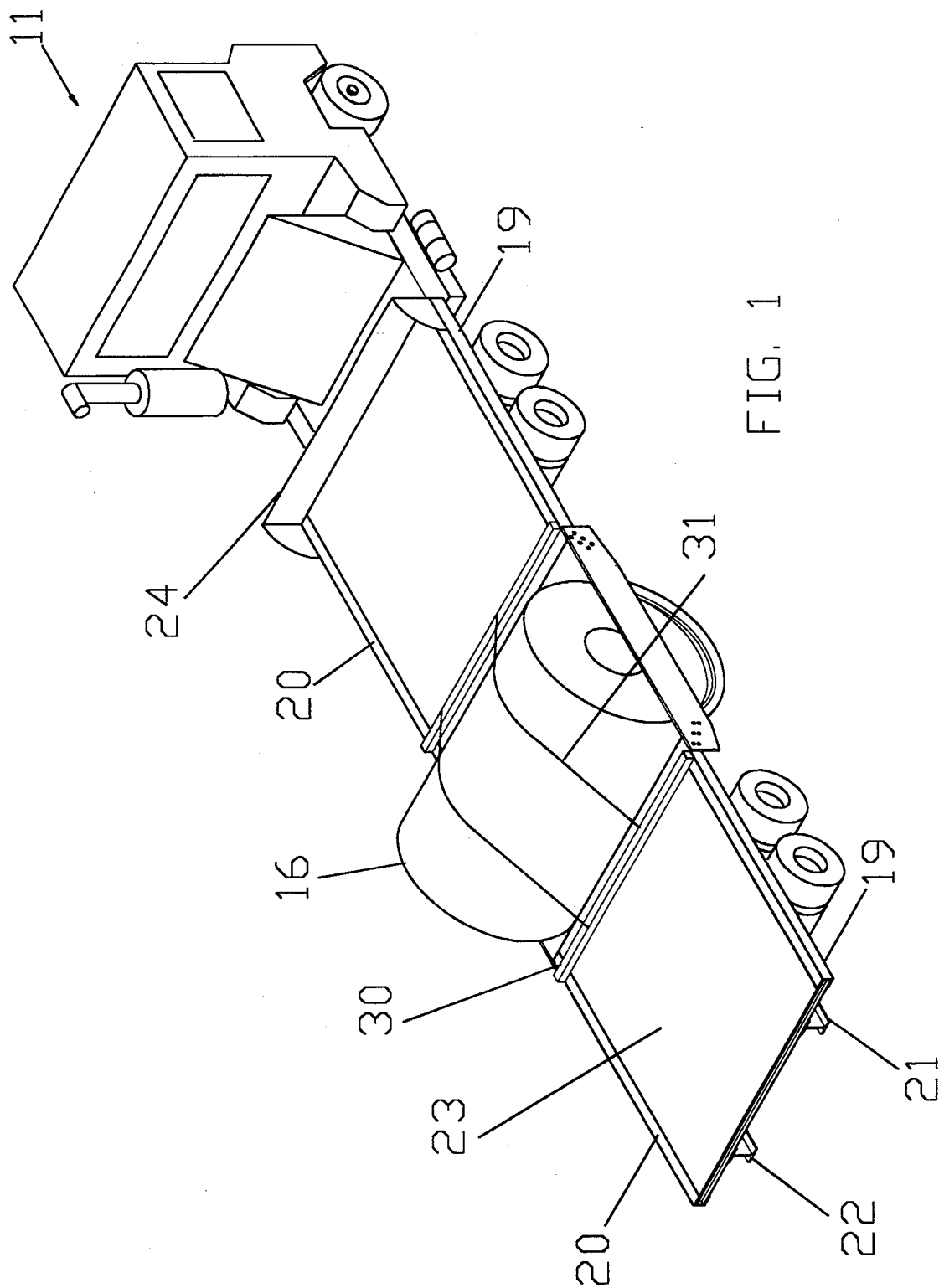
FIG. 1 is an elevational perspective view of a trailer body embodying the features of the invention.

In describing a preferred embodiment of the invention illustrated in the drawings, specific terminology will be used for the sake of clarity. However, the invention is not intended to be limited to the specific terms selected, and it is to be understood that each specific term includes all technical equivalents which operate in a similar manner to accomplish a similar purpose.

Figure 2:
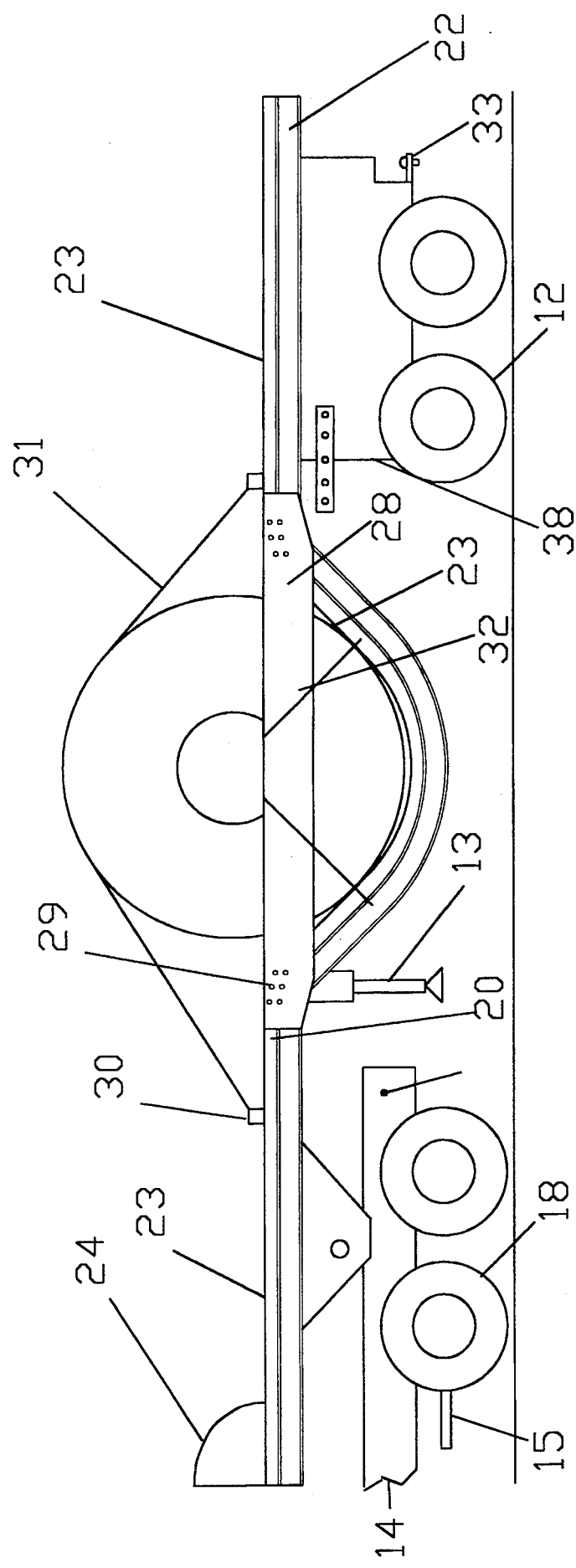
FIG. 2 is a side elevational view of the trailer body showing a long coil of metal.

Referring now to FIGS. 1 and 2, reference numeral 10 indicates the semi-trailer, a tractor 11 for pulling the trailer 10, including rear wheels 12, a drive shaft 15 and the numeral 13 indicating the dollies which support the front end of trailer 10 when disconnected from the tractor 11. The tractor 11 and the undercarriage 14 may, for the purpose of the present description, be considered as conventional and will not be described in detail herein. In FIG. 1, the trailer 10 is shown loaded with a coil of steel strip material 16.

Figure 3:
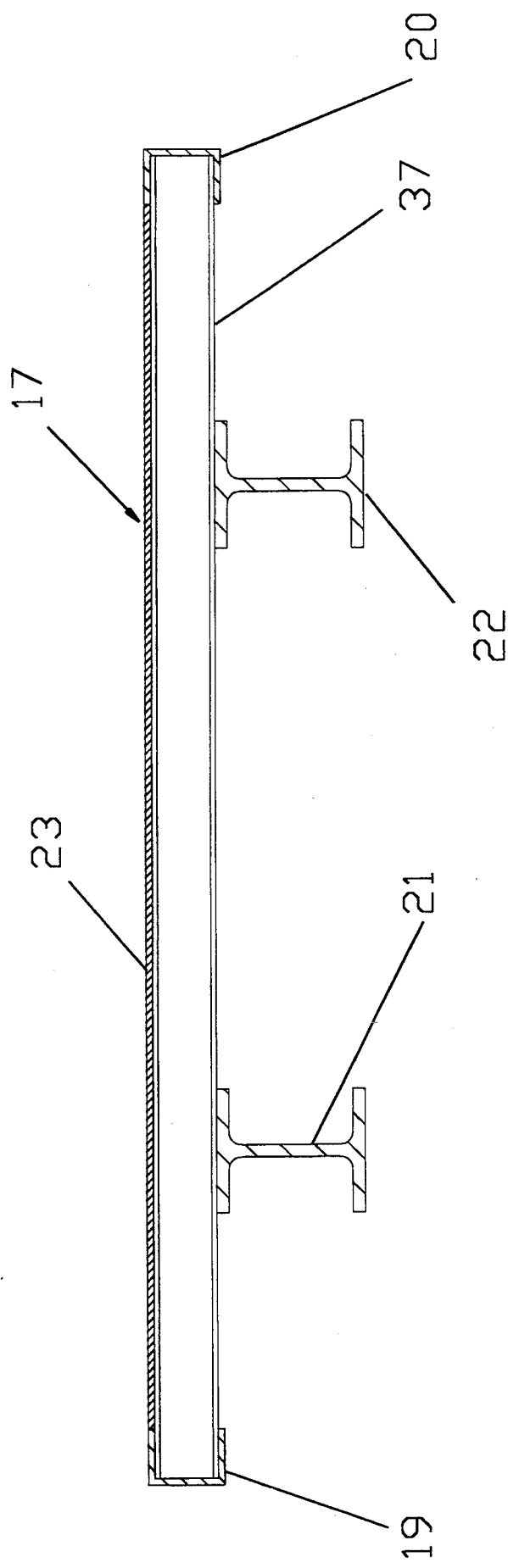
FIG. 3 is a cross sectional view of the trailer flat bed along the transverse direction of the bed.
Figure 4:
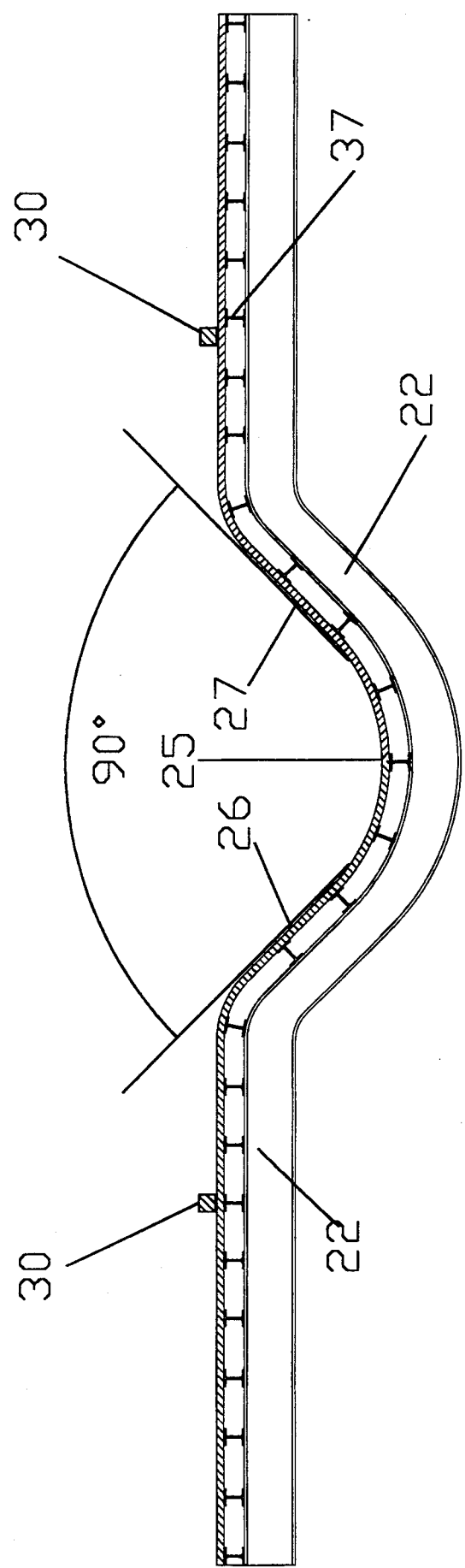
FIG. 4 is a cross-sectional view of the trailer flat bed of the invention, along the longitudinal direction of the bed.

The trailer 10 consists of a body structure 17 supported at one end on an undercarriage 14, including tandem axles and wheels 18, and on the other end by undercarriage 38 including wheels 12, and longitudinal channels 21, and 22. The body structure 17 may be formed by welding or fastening steel plates 23 to the top sides of "I" beams 37 which are fastened to the tops of "I" beams 21 and 22 and channels 19 and 20, are fastened to the ends of "I" beams 37 as shown in FIGS. 3 and 4, for example. A steel plate 24 is disposed at the front of the body structure 17 to provide a safety shield for the driver of the tractor.

Longitudinal channels 19 and 20 and "I" beams 21 and 22 are formed as shown in FIGS. 1 and 3. In a preferred embodiment, a 10"×3" steel channel beam was used with a "V" shaped notch 25 (FIG. 4) being formed at the center section with downward sloping sections 26 and 27 forming a 90° angle at the notch 25. The notch 25 supports a steel coil with a 5' OD, 1½" ID, 8' in length with the center line of the 5' coil, level with the top surface of the bed. The bottom of "I" beams 21 and 22 at notch 25 may be 10" above the surface of the roadbed when the coil 16 is loaded and secured on the trailer 10. Steel cross bar members 28 are fastened, preferably with bolts 29, to the open ends of the "V" formed by channels 19 and 20 to provide additional stiffness to the channels to support larger weights and to prevent transverse motion of the load. A trailer hitch 33 may be attached to rear undercarriage 38 for pulling a second trailer in those states permitting double trailers.

Figure 5:
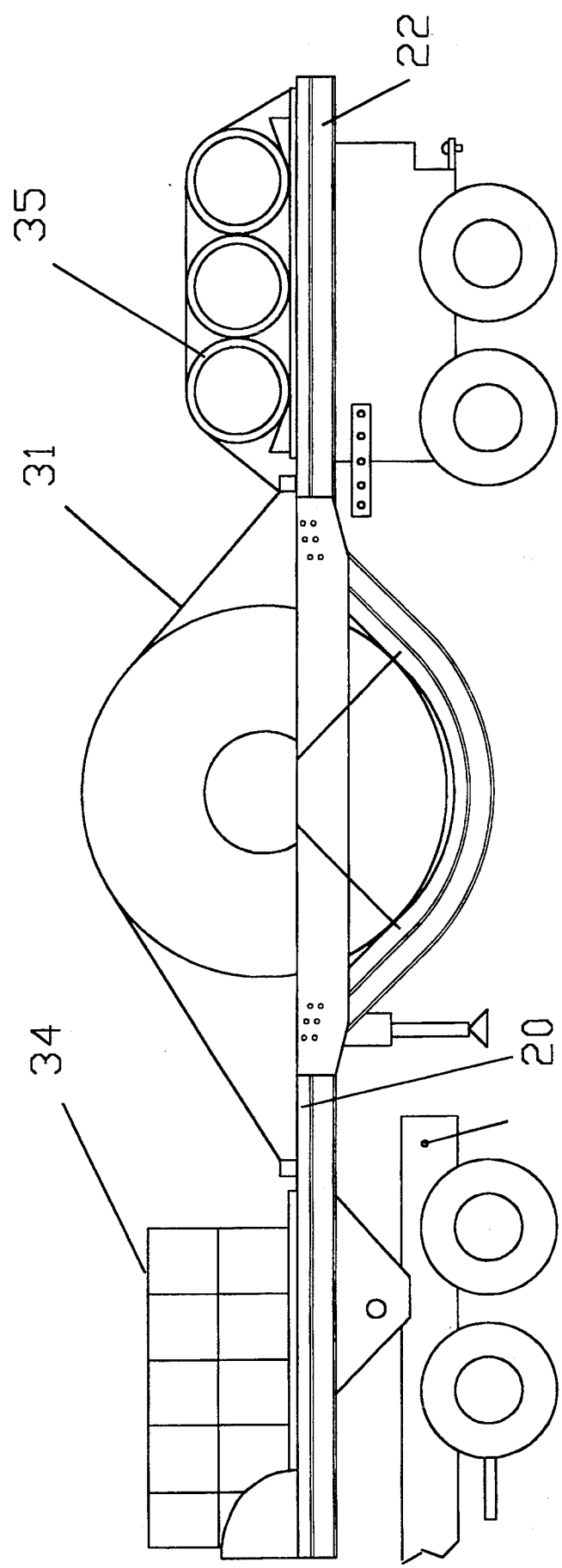
FIG. 5 is a side elevational view of the trailer body showing a combination load.
Figure 6:
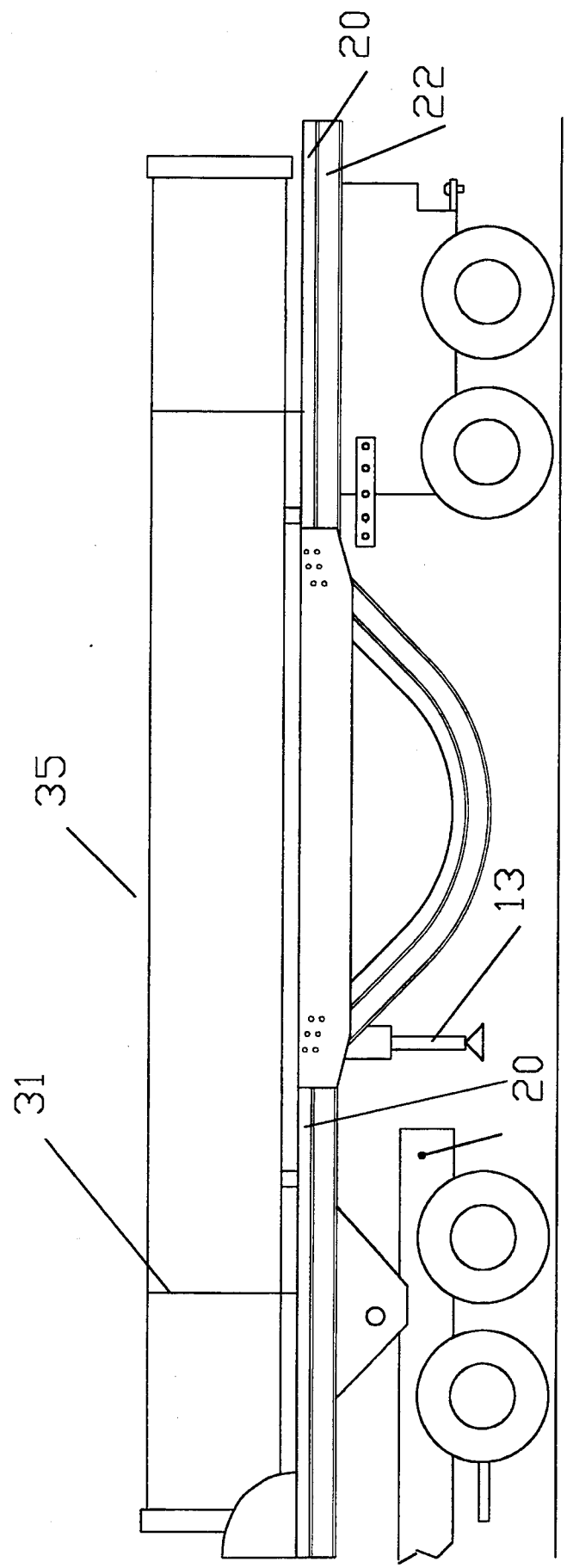
FIG. 6 is a side elevational view of the trailer body showing a long load spanning the "V" notch.

FIG. 5 shows trailer 10 with a combination load of flat bundles of sheared steel 34 fore or pipe 35 aft of the "V" notch in conjunction with carrying coils. Straps 31 are fastened to side rails 36 in a conventional manner to hold the pipe 35 in a secure manner. FIG. 6 shows trailer 10 carrying a long load of pipes 35 secured with straps 31 to the side rails 36 in a conventional manner. Another embodiment, not shown, comprises a trailer having two "V" notches formed in the trailer bed with another set of wheels disposed intermediate the "V" notches.

As an example of the types of loads which may be carried by the trailer of the invention, a 5'D×8' long coil of steel would weigh 67,400 lbs. and an aluminum coil would weigh 23,500 lbs. Because of the stability provided by the notch 25, a coil may be placed in the notch 25 at the loading bay by the hoisting equipment, and the trailer may be moved to a remote area, away from the busy loading area, to be further fastened to the trailer 10, with straps 31 and 32. After the load is securely fastened to the trailer 10, the driver may proceed to his delivery destination without fear for his or other driver's safety. When the coil is securely held in place in the notch 25, it is very unlikely to be upset by a sudden stop or sudden maneuver because of its low center of gravity.

In a second embodiment shown in FIGS. 7-10, a "V" notch 25' is formed longitudinally in the trailer 10'.

Longitudinal "I" beams 21' and 22' are not formed with a "V" notch as "I" beams 21 and 22 are in the first embodiment, however beams 21' and 22' are formed as shown in FIG. 10 with two 90° angles to bypass the load carrying notch 25'. In contrast, transverse "I" beams 37' and steel plates 23' are formed with the "V" notch 25' longitudinally in the trailer 10'. The bottom of notch 25' is about ten inches above the roadbed surface when loaded. After the coil 16 is loaded into the deep "V" notch 25', straps 31 are used to secure the load to the trailer 10.

While certain embodiments of the invention have been described for illustrative purposes, the invention is not limited thereto. Various other modifications or embodiments of the invention will be apparent to those skilled in the art in view os this disclosure. Such modifications or embodiments are within the spirit and scope of the invention.

What is claimed is:

1. A body for a trailer for carrying loads of long, coiled articles disposed transversely of said trailer, and various shaped articles on a flat surface of the trailer, said body comprising:

a plurality of longitudinal outer channels and inner longitudinal "I" beams, said longitudinal beams each having a front end, a back end, top and bottom sides, and being spaced from one another in a horizontal direction, each of said beams having a "V" shaped notch formed downwardly, intermediate said front and back ends, steel transverse beams, having top and bottom sides, fastened across said top side of said longitudinal "I" beams for forming flat bed areas and retaining said "I" beams in a spaced relationship, steel plates fastened across said top side of said "V" notches, for seating said coil and preventing marring and scratching thereof, steel bars fastened across said top side of said steel plates, a first bar being located forward of said notch and a second bar being located rearward of said notch, steel cross bar members fastened to said outer channels at the open ends of the "V" formed by said outer channels for providing additional stiffness and to prevent transverse motion of said articles, and holding means for locking said loads in carrying position.

2. A trailer bed for transporting loads of coils of metal or other cylindrical objects disposed transversely of said trailer, and various shaped articles on a flat surface of the trailer, said trailer comprising:

two longitudinal outer channel beams and two inner longitudinal "I" beams, said longitudinal beams being spaced apart from one another in a horizontal direction, each of said beams having a front end, a back end, top and bottom sides and a "V" shaped notch formed downwardly, intermediate said front and back ends, steel transverse "I" beams having top and bottom sides, said bottom sides being fastened transversely across said top sides of said longitudinal "I" beams for forming flat bed areas and retaining said "I" beams in a spaced relationship, steel plates fastened across said top sides of said transverse beams and on each side of said "V" notch, for seating said coil and preventing marring and scratching thereof, two steel bars fastened transversely across said steel plates, a first bar being located forward of said notch and a second bar being located rearward of said notch, steel cross bar members fastened to the open ends of the "V" formed by said outer channel beams for providing additional stiffness and to prevent transverse motion of said coils, fastening means attached to said steel bars for locking said loads of coil and various shaped articles in carrying position, and undercarriage means including tandem axles and wheels for supporting and carrying said trailer bed.

3. A trailer bed for transporting loads of coils of metal or other cylindrical objects disposed transversely of said trailer as described in claim 2 wherein said "V" shaped notch is formed at 90° and said bed includes a shield extending upwardly across said front ends of said inner longitudinal "I" beams cab of a towing vehicle.

* * * * *